Sept. 13, 1932.  W. J. ANDRES  1,876,575
BRAKE OPERATING MEANS
Filed March 28, 1929
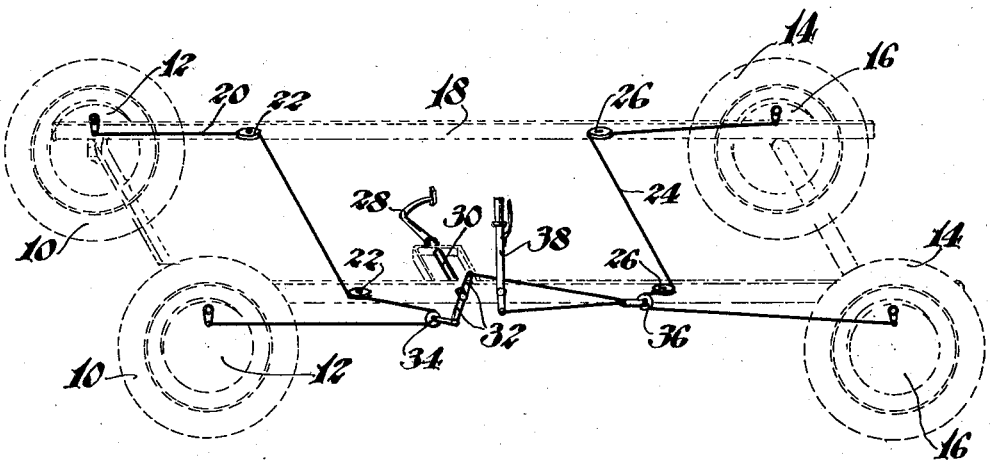
INVENTOR.
William J. Andres
BY
　　ATTORNEY Patented Sept. 13, 1932

1,876,575

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MEANS

Application filed March 28, 1929. Serial No. 350,473.

This invention relates to brakes, and is illustrated as embodied in an automobile chassis provided with a system of four-wheel brakes. An object of the invention is to provide a simplified system of operating mechanism, minimizing the use of operating shafts and bearings therefor, by utilizing flexible cables or equivalent means connected to the front brakes and connected to the rear brakes, and operated alternatively by the service pedal and the emergency brake lever or their equivalents.

The above and other objects and features of the invention, including various novel and desirable details of construction, will be apparent from the following description of the illustrative embodiment shown in the accompanying drawing, in which:

The figure is a diagrammatic perspective of an automobile chassis embodying one form of my invention.

The illustrated chassis includes swiveled front wheels 10 having brakes 12, and driven rear road wheels 14 having brakes 16, supporting a chassis frame 18 by means of the usual springs.

The front brakes are operatively connected by means such as a flexible steel cable 20 passing over pulleys 22 on the chassis frame, and the rear brakes are operatively connected by means such as a cable 24 passing over similar pulleys 26. The service pedal 28 operates a shaft 30 provided with arms 32 connected to pulleys 34 and 36 engaging respectively the cables 20 and 24. An emergency lever 38 is also connected to the pulley 36, so that it applies the rear brakes but not the front brakes.

Pulleys 22 are approximately at the rear ends of the front springs, so that the portion of cable 20 which extends crosswise of the chassis is substantially in a neutral axis with respect to the up and down movements of the front axle. Similarly the crosswise portion of cable 24 is in a neutral axis with respect to movements of the rear axle.

While one illustrative embodiment has been described in detail, it is not my intention to limit the scope of the invention to that particular embodiment, or otherwise than by the terms of the appended claims. The present invention is junior in date of invention to Sanford application No. 499,681, filed December 3, 1930, as a division of application No. 247,505, filed January 18, 1928, and it is not my intention to claim herein any of the subject-matter disclosed in said Sanford application.

I claim:

1. A vehicle having a pair of front brakes operatively connected by a cable, a pair of rear brakes operatively connected by a second cable, a pedal having rigid therewith a pair of oppositely-extending arms one of which has fixed thereto a connection extending respectively to the first cable to operate the front brakes, an emergency lever, and a cable fixedly connected at its opposite ends to the emergency lever and the other of said arms and intermediately connected to the second cable.

2. A vehicle having a pair of front brakes operatively connected by a cable, a pair of rear brakes operatively connected by a second cable, a pedal having rigid therewith a pair of oppositely-extending arms one of which has fixed thereto a connection extending respectively to the first cable to operate the front brakes, an emergency lever, and cable sections connecting the second cable respectively to the emergency lever and to the other of said arms.

In testimony whereof, I have hereunto signed my name.

WILLIAM J. ANDRES.